3,359,079
PROCESS FOR THE STRIPPING OF ACTINIDES CONTAINED IN ORGANIC SOLVENTS WITH NITROUS ACID

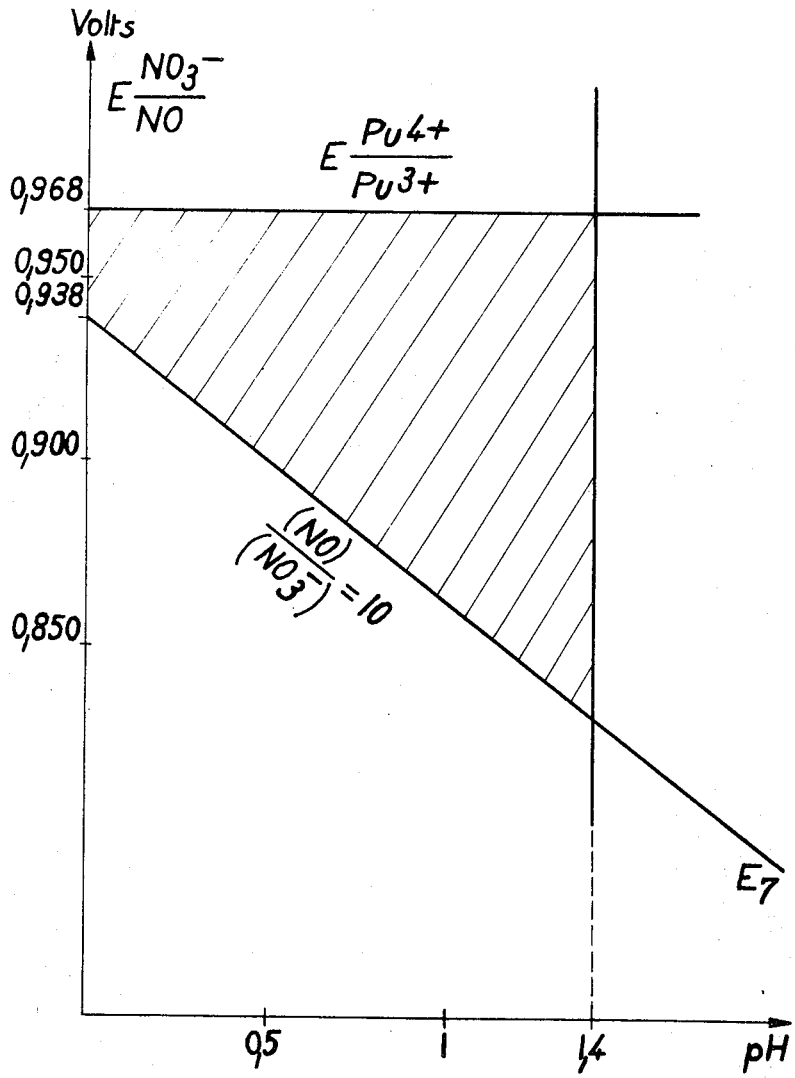

André Bathellier, Sceaux, Hauts-de-Seine, France, assignor to Commissariat à l'Energie Atomique, Paris, France
Filed Sept. 8, 1966, Ser. No. 577,879
Claims priority, application France, Sept. 17, 1965, 31,858
3 Claims. (Cl. 23—339)

ABSTRACT OF THE DISCLOSURE

The actinides of uranium, plutonium and neptunium, are re-extracted from organic solvents of tributylphosphate and trilaurylamine in which they have been extracted by contact of their nitric solutions with the solvents, uranium having a valence of VI by reacting organic solvents in the absence of air with a nitric aqueous solution in which nitrous acid is formed either by introducing sodium nitrite or nitrogen dioxide in a weak nitric solution.

---

The present invention has for its object a process for stripping actinides and especially uranium, neptunium and plutonium from an organic tolvent into which they have been extracted by contacting their nitric acid solutions with said solvent.

The purification of uranium, neptunium and plutonium is usually obtained by solvent extraction processes. The solvents employed, such as tributylphosphate or trilaurylamine in solution in a paraffinic hydrocarbon such as dodecane, are loaded with the actinide by contacting with nitric acid solutions of these latter.

The following step of the process consists in stripping these metallic nitrates contained in the solvent. This stripping process can be performed by different methods such as the following:

*Stripping by dilution.*—Since the metals are extracted into the solvent in the form of nitric acid complexes, it is merely necessary in theory to reduce the concentration of the nitrate ion in aqueous solution in order that the complex should be destroyed and that the metal should be no longer extractable. This method of stripping can be illustrated by the stripping of uranyl nitrate contained in tributylphosphate by dilute $HNO_3$.

*Stripping by change of valence.*—By means of a suitable oxidizing or reducing reagent, it is possible to change an extracted metal from an extractable valence state to an inextractable valence state. This is the case with nitric acid solutions of ferrous iron which reduce Pu IV to Pu III and cause this latter to leave the solvent which contains them.

*Stripping by displacement.*—If an acid has a high affinity for a solvent, it occupies all of the valence sites thereof and returns into aqueous solution the metals which were fixed therein. This mode of stripping can be illustrated by the stripping of plutonium nitrate contained in trilaurylamine by perchloric acid solutions.

*Stripping by formation of complexes.*—When any chemical substance in aqueous solution forms an inextractable complex with the extracted metal, its solutions are capable of re-extracting or stripping said metal. This is the case with stripping by sulphuric acid of the plutonium contained in trilaurylamine.

In practice, stripping processes are often of the composite type or, in other words, stripping by displacement is also a process of stripping by dilution and even by complexing.

The process in accordance with the invention consists in stripping the actinides and especially uranium, plutonium and neptunium which have been extracted into an organic phase consisting of tributylphosphate or trilaurylamine diluted in an inert solvent by nitrous acid.

Two observations have led the inventors to the development of the novel stripping process:

(1) The nitrous acid $HNO_2$ has a sufficiently high affinity for the usual organic solvents, namely tributylphosphate and trilaurylamine, to permit of stripping by displacement.

(2) Under predetermined conditions, nitrous acid is capable of reducing Pu IV to Pu III. The stripping action which is thus obtained is superimposed on the action which results from displacement.

Nitrous acid can be introduced into the stripping aqueous solutions in two ways:

Either in the form of sodium nitrite $NaNO_2$ in weak nitric acid solutions, in which case the nitrous acid is then unstable and dismutes slowly according to the reaction:

$$3HNO_2 \rightarrow 2NO + HNO_3 + H_2O \quad (1)$$

However, its temporary presence makes it possible to carry out re-extraction or stripping processes if steps are taken to carry out the operation at a sufficiently high speed.

Or in the form of NO which is contacted with a nitric acid solution which is maintained out of contact with air. The reaction involved in the formation of $HNO_2$ is reverse to the preceding:

$$2NO + NO_3^- + H^+ + H_2O \rightleftharpoons 3HNO_2 \quad (2)$$

and has as an equilibrium constant:

$$K = \frac{(HNO_2)^3}{(NO)^2(NO_3^-)(H^+)} = 0.69 \quad (3)$$

which shows that the $HNO_2$ concentration is proportional to the power $\tfrac{2}{3}$ of the pressure of NO.

The stripping yield by displacement evidently depends on the readiness with which nitrous acid leaves the aqueous phase to saturate the solvent. This readiness which varies from one solvent to another can be expressed in the form of distribution coefficients, viz:

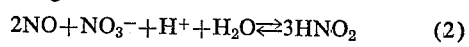

$$Kd = \frac{(HNO_2) \text{ org.}}{(HNO_2) \text{ aq.}}$$

The value of these coefficients has been determined by bubbling NO at atmospheric pressure in volume-to-volume mixtures of solvents and nitric acid having different concentrations. The results obtained are recorded in Table I below.

TABLE I

| $HNO_3$, N in Aq. Sol. | TBP, 30% | TLA, 5% | TLA, 20% |
|---|---|---|---|
| 0.05 | --------- | 1 | 2.4 |
| 0.1 | 2.5 | 0.96 | 2.3 |
| 0.2 | --------- | 0.74 | 2.5 |
| 0.3 | 7 | 0.68 | 2 |
| 0.5 | 7.5 | 0.61 | 1.6 |
| 1 | 5.4 | 0.31 | 0.94 |
| 1.5 | 5.5 | --------- | --------- |

It is apparent from a study of the above table that, so far as TLA is concerned, the increase in nitric acid concentration of the aqueous phase produces by competitive effect a reduction of the distribution coefficient of nitrous acid. It is additionally found that nitrous acid has a special affinity for TBP.

In order to study the extent of the process of stripping of metals by displacement with nitrous acid, volume-to-volume mixtures of solvent loaded with uranium VI or neptunium IV and dilute nitric acid have been subjected for a period of three-quarters of an hour to a bubbling of NO at atmospheric pressure; the α counting of separate phases has made it possible to establish the values of the distribution coefficients $E_a°$ of $UO_2^{++}$ and $N_p^{4+}$ in respect of each type of mixture and to compare them with the values obtained without bubbling of NO.

TABLE II

| $HNO_3$, N aqueous | With NO | | Without NO | |
|---|---|---|---|---|
| | U VI in 30% TBP | Np IV in 20% TLA | U IV in 30% TBP | Np IV in 20% TLA |
| 0.1 | -------- | 0.65 | 0.25 | -------- |
| 0.2 | -------- | 0.24 | 0.7 | -------- |
| 0.3 | -------- | 0.42 | 1.3 | 23 |
| 0.5 | 0.083 | 0.46 | 2.5 | 30 |
| 1 | 0.23 | 0.86 | 7 | 70 |
| 1.5 | 0.50 | -------- | 10 | 95 | equal to 0.1 N. The portion shown in hatchings in the figure represents the zone in which it is reasonable to work in order to obtain the reduction of plutonium.

According to the process of the present invention, the plutonium-loaded solvent is stirred in a nitric oxide atmosphere with dilute $HNO_3$, the nitrous acid displaces a part of the plutonium into the aqueous phase in which it is then reduced. The equilibrium displacement then continues until equilibration in aqueous phase of the oxidation-reduction potentials of the pairs $Pu^{4+}/Pu^{3+}$ and $NO_3^-/NO$. The final state of these equilibria is characterized by a distribution of the plutonium between the organic and aqueous phase, which may be expressed by the distribution coefficient $E_a°$ of plutonium.

A certain number of values of this coefficient have been determined by equilibrations which each lasted ¾ of an hour and are recorded in Table III hereunder.

TABLE III

| $HNO_3$ N Aq. sol. | 30% TEP | | 20% TLA | | 5% TLA | |
|---|---|---|---|---|---|---|
| | $E_a°$ Pu | $HNO_2$ aq. equil., M | $E_a°$ Pu | $HNO_2$ aq. equil., M | $E_a°$ Pu | $HNO_2$ aq. equil., M |
| 0.05 | -------- | -------- | 0.028 | 0.036 | 0.018 | 0.037 |
| 0.1 | 0.006 | 0.1 | 0.031 | 0.047 | 0.021 | 0.046 |
| 0.2 | -------- | -------- | 0.11 | 0.045 | 0.036 | 0.063 |
| 0.3 | 0.015 | 0.1 | 0.38 | 0.067 | 0.022 | 0.075 |
| 0.5 | 0.013 | 0.09 | 0.86 | 0.095 | 0.067 | 0.105 |
| 1 | 0.080 | 0.15 | 7.3 | 0.180 | 1.6 | 0.19 |
| 1.5 | 0.12 | 0.16 | -------- | -------- | -------- | -------- |

Nitrous acid also makes it possible to re-extract plutonium from an organic phase by a change of valence.

Nitrous acid reduces Pu IV according to the reactions and in agreement with the following potentials:

$$HNO_2 + H_2O \rightleftharpoons NO_3^- + 3H^+ + 2e \quad (4)$$

$$Pu^{4+} + e \rightleftharpoons Pu^{3+} \quad (5)$$

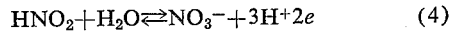

$$E_5 = 0.968 + \log 0.058 \frac{Pu^{4+}}{Pu^{3+}}$$

The potential $E_4$ which may be written:

shows that the pair $NO_3^-/HNO_2$ is more highly reducing as the acid concentration of the solution is lower.

However, in order to avoid any danger of polymerization and hydrolysis of the plutonium, the field of work is limited to a pH value which is lower than 1.4.

In the case in which the nitrous acid is formed in solution by bubbling of NO, the concentration of this acid depends in respect of a given $(H^+)$ concentration on the ratio $NO/NO_3^-$, and the same applies to the oxidation-reduction potential.

By eliminating $HNO_2$ between the two reactions:

(8) $NO + H_2O \rightleftharpoons HNO_2 + H^+ + e$ with $Eo = 0.99$ v.

and (4) $HNO_3 + 2H^+ + 2e \rightleftharpoons HNO_2 + H_2O$ with $Eo = 0.94$ v.

There is obtained (7) $NO + 2H_2O \rightleftharpoons NO_3^- + 4H^+ + 3e$ with $Eo = 0.957$ v.

the oxidation-reduction potential of which may be written:

$$E_7 = 0.957 + \log 0.019 \frac{(NO_3^-)}{(NO)} - 0.077 \text{ pH}$$

which is a decreasing linear function of the pH value.

This function has been shown graphically in the figure in respect of (NO) equal to 1 atmosphere and $(NO_3^-)$ Two examples of application of the process in accordance with the invention will now be described without implied limitation, said examples being respectively applied to the re-extraction of plutonium from an organic solvent constituted by trilaurylamine in a 5% solution by volume in dodecane, and to the re-extraction of hexavalent uranium from an organic solvent consisting of 30% tributylphosphate in dodecane.

*Example I*

The equipment employed consisted of a bank of mixer-settlers which was completely enclosed and comprised twelve stages. The twelfth stage was reserved for the introduction of the stripping aqueous phase and for the bubbling of NO in this latter, excess NO being then permitted to fill all the free sections of the bank and to be discharged at stage 1 through an outlet provided for this purpose.

The solvent to be stripped which is admitted at stage 1 has the following composition:

$HNO_3$, 5% TLA in dodecane, Pu 0.375 gr./liter; Free 0.05 N $HNO_3$ at a flow rate of 4 v./hour.

The stripping aqueous solution consisting of 0.05 N $HNO_3$ saturated with NO is introduced in stage 11 at a flow rate of 1 v./hour.

Analyses carried out after equilibration of the bank of mixer-settlers made it possible to draw up the following table of concentrations of the different chemical species employed.

TABLE IV

| Bank stage | 4 $NO_2$, M | | $HNO_3$, N aq. | Pu, mgr./l | | $E_a°$ Pu |
|---|---|---|---|---|---|---|
| | Org. | Aq. | | Org. | Aq. | |
| 1 | 0.046 | 0.064 | 0.317 | 470 | 1,500 | 0.31 |
| 2 | 0.046 | 0.061 | 0.226 | 260 | 1,820 | 0.14 |
| 3 | 0.047 | 0.061 | 0.205 | 140 | 1,380 | 0.10 |
| 4 | 0.048 | 0.064 | 0.181 | 50 | 960 | 0.052 |
| 5 | 0.049 | 0.070 | 0.163 | 13 | 438 | 0.03 |
| 6 | 0.046 | 0.066 | 0.131 | 6 | 219 | 0.027 |
| 7 | 0.050 | 0.070 | 0.130 | 2 | 120 | 0.017 |
| 8 | 0.044 | 0.060 | 0.118 | 0.8 | 43 | 0.019 |
| 9 | 0.047 | 0.063 | 0.107 | 0.6 | 12 | 0.05 |
| 10 | 0.048 | 0.058 | 0.103 | 0.4 | 4 | 0.1 |
| 11 | 0.044 | 0.040 | 0.048 | 0.7 | 3 | 0.23 |

These figures show that the stripping process or re-extraction yield is 99.8%.

Example II

The equipment employed for the re-extraction of hexavalent uranium is identical with that of Example I.

The organic phase consists of 30% tributylphosphate in dodecane, and is loaded with uranium in a proportion of 72 g./l. (flow rate of 150 cm.$^3$/h.)

The aqueous phase has a nitric acid concentration of 0.125 N. During the manipulation, nitrogen dioxide is bubbled so as to introduce nitrate ions into the bank of mixer-settlers (flow rate of 75 cm.$^3$/hr.).

The nitrogen dioxide is first washed with a concentrated sulphuric acid solution in order to eliminate the nitrogen peroxide. Its pressure within the bank of mixer-settlers is adjusted to atmospheric.

After four hours of operation, the total acid concentration of the aqueous phase feed has increased from 0.125 N to 0.150 N.

The concentrations of the exit solutions are summarized in the following table:

| Concentration | Uranium (g./l.) | Nitrate (M) | Total acid concentration (N) |
|---|---|---|---|
| Organic | 4.5 | 0.37 | |
| Aqueous | 135 | 0.09 | 0.145 |

The process in accordance with the invention presents a certain number of advantageous features:

The stripping of plutonium which is extracted with TLA or TBP is carried out by means of a reagent which is eliminated spontaneously after use, with the result that the remainder of the process is not disturbed. Moreover, should it be found desirable to accelerate the decomposition of the nitrous acid which remains in the stripping solution, it is merely necessary to increase the acid concentration. Accordingly, the nitrous acid re-oxidizes plutonium III to plutonium IV and the solution which is obtained can be directly subjected to precipitation or to a further extraction process.

The stripping of U VI, Np IV, Pu IV contained in TBP or TLA is obtained by displacement at medium acid strength (1–1.5 N).

It is possible to separate Np IV from Pu IV by stripping. In a nitric oxide atmosphere and in a 1 N nitric acid medium, the distribution coefficients of Np IV and Pu IV in 20% TLA are respectively $E_{aNp}°=0.86$ and $E_{aPu}°=7.3$, and a countercurrent stripping under these conditions makes it possible to separate them.

What we claim is:

1. In a process for stripping actinides and especially uranium valence VI, plutonium valence IV and at a pH less than 1.4 and neptunium valence IV contained in organic solvents tributyl phosphate or trilaurylamine diluted in an inert solvent into which they have been extracted by contacting their nitric acid solutions with said solvents, the step of stripping said actinides by nitrous acid.

2. A process as described in claim 1, said nitrous acid being formed in the stripping aqueous solution by the reaction of nitrogen dioxide with a dilute nitric acid solution out of contact with air.

3. A process as described in claim 1, said nitrous acid being formed in the stripping aqueous solution by reaction of sodium nitrite with a dilute nitric acid solution.

No references cited.

L. DEWAYNE RUTLEDGE, *Primary Examiner.*

BENJAMIN R. PADGETT, *Examiner.*

S. TRAUB, R. L. GRUDZIECKI, *Assistant Examiners.*